United States Patent [19]
Zito

[11] Patent Number: 5,612,148
[45] Date of Patent: Mar. 18, 1997

[54] PROCESS FOR ENERGY STORAGE AND/OR POWER DELIVERY WITH MEANS FOR RESTORING ELECTROLYTE BALANCE

[75] Inventor: Ralph Zito, Chapel Hill, N.C.

[73] Assignee: National Power PLC, Wiltshire, United Kingdom

[21] Appl. No.: 226,986

[22] Filed: Apr. 13, 1994

[51] Int. Cl.$^6$ ............................................. H01M 8/06
[52] U.S. Cl. ............................... 429/15; 429/17; 429/50; 429/105
[58] Field of Search ............................ 429/14, 15, 17, 429/19, 50, 51, 13, 105

[56] References Cited

U.S. PATENT DOCUMENTS

| | | | |
|---|---|---|---|
| 3,920,474 | 11/1975 | Zito, Jr. .................................. | 429/15 |
| 4,053,684 | 10/1977 | Zito, Jr. et al. ......................... | 429/15 |
| 4,069,371 | 1/1978 | Zito ...................................... | 429/38 |
| 4,218,519 | 8/1980 | Frank .................................... | 429/15 |
| 4,485,154 | 11/1984 | Remick et al. . | |
| 4,492,741 | 1/1985 | Struthers ............................... | 429/34 |
| 5,496,659 | 5/1996 | Zito ...................................... | 429/105 |

*Primary Examiner*—Anthony Skapars
*Attorney, Agent, or Firm*—Antonelli, Terry, Stout & Kraus, LLP

[57] ABSTRACT

An electrochemical apparatus for energy storage and/or power delivery comprises multi-compartment cells with the $+^{ve}$ chamber and the $-^{ve}$ chamber of each cell being separated by at least one buffer chamber through which an idler electrolyte circulates, the electrolyte circulating through the $-^{ve}$ chamber during power delivery containing sulfide and the apparatus comprising means for restoring the electrolyte balance of the $-^{ve}$ electrolyte by the oxidation of any $S^{2-}$ and/or $HS^-$ ions contained in the idler electrolyte to form sulfur, means for the collection of precipitated sulfur and means for the reintroduction of the precipitated sulfur into the $-^{ve}$ electrolyte.

11 Claims, 3 Drawing Sheets

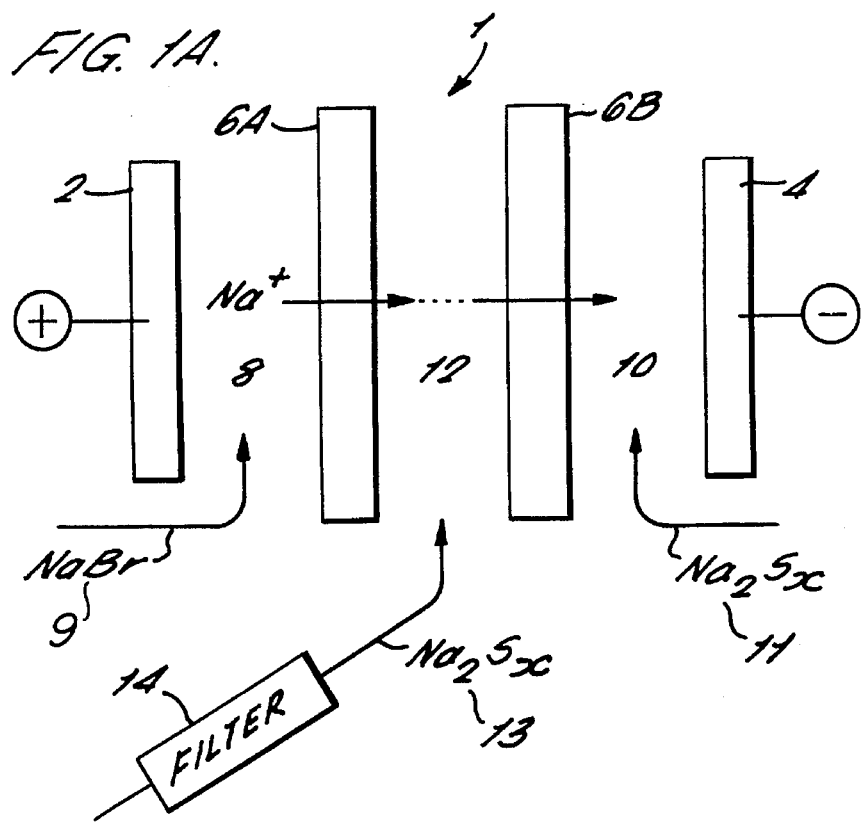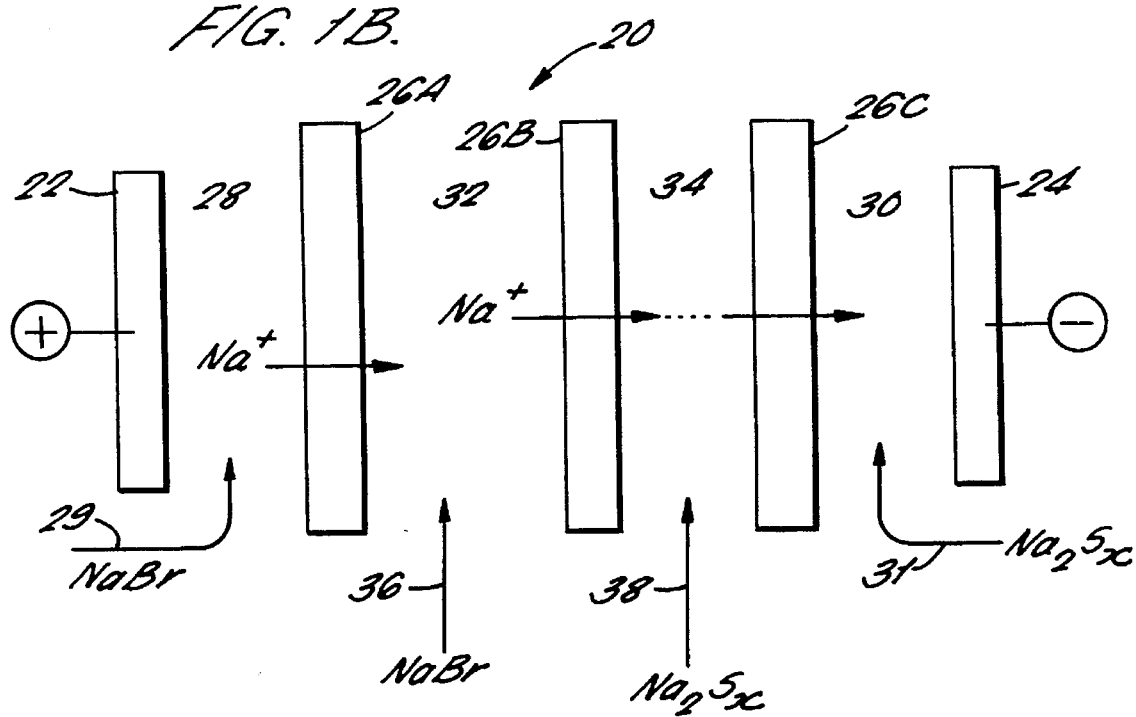

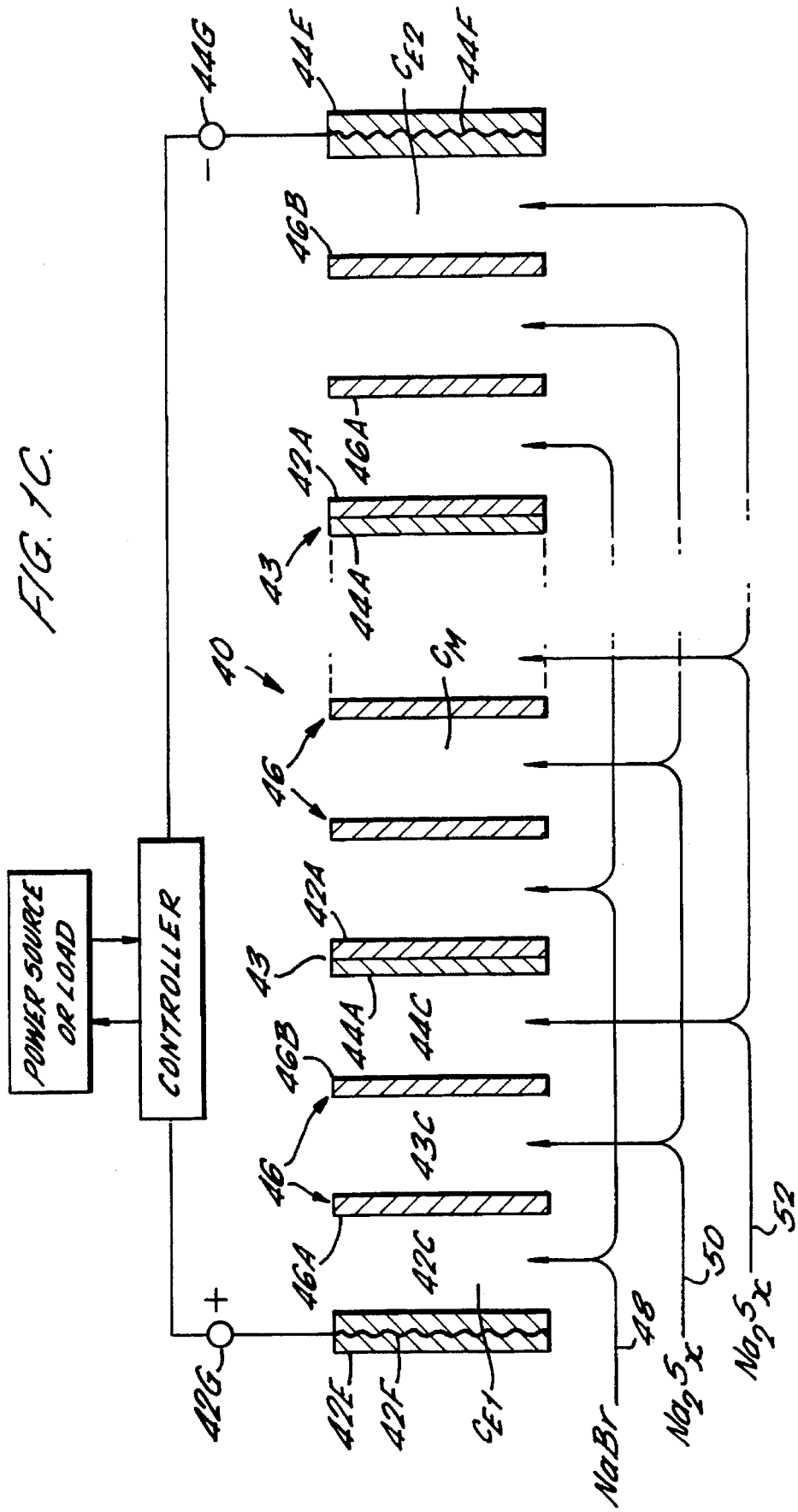

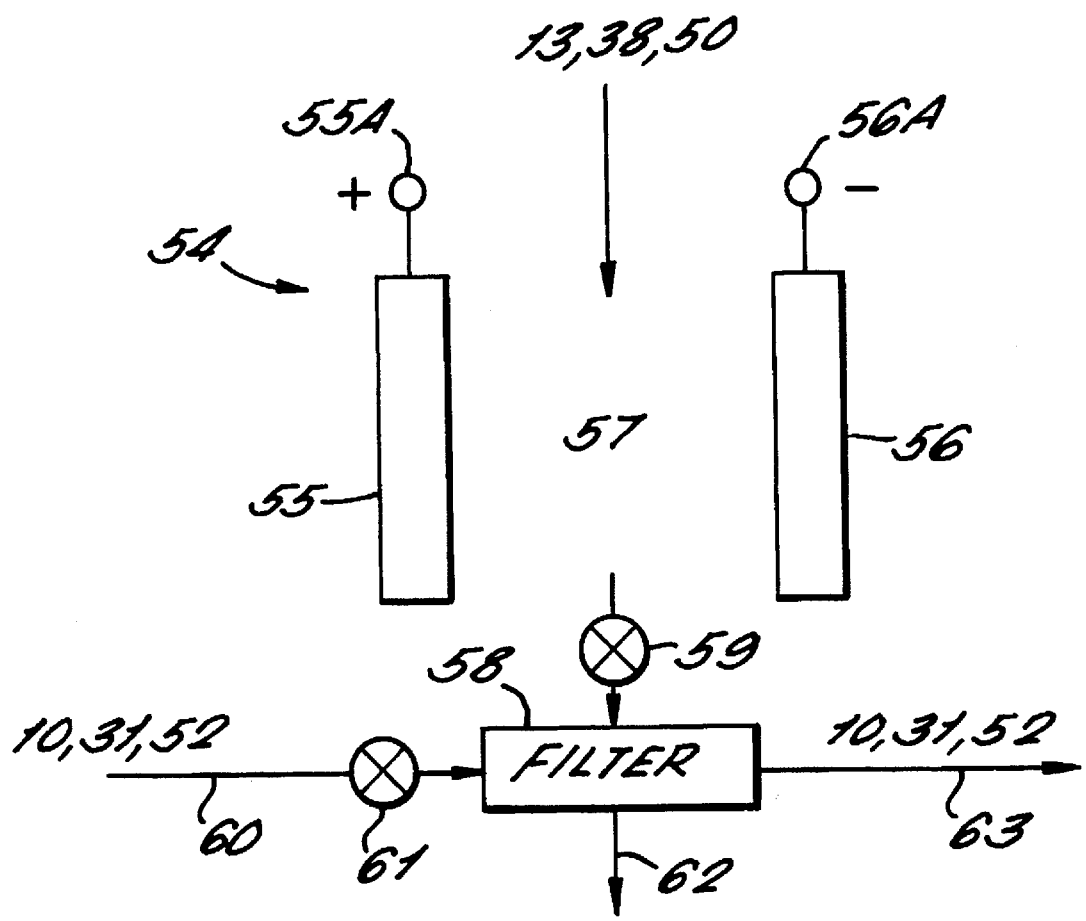

PROCESS FOR ENERGY STORAGE AND/OR POWER DELIVERY WITH MEANS FOR RESTORING ELECTROLYTE BALANCE

FIELD OF THE INVENTION

The present invention relates to a process and apparatus for energy storage and/or power delivery with means for restoring electrolyte balance and, in particular, to such a process and apparatus in which an electrolyte containing sulfide circulates through the $-^{ve}$ chamber during power delivery and means are provided for restoring the electrolyte balance at least of the $-^{ve}$ electrolyte.

The reactions of interest for the purposes of this invention are substantially reversible such that driving current into such a system charges the system by storing energy in chemical reactants. Chemical reactions take place on either side of an ion transport system (such as a membrane) with selective charge carriers being transported through the membrane. During power generation these chemical reactions are reversed supplying current (power) to a load.

Some systems reconstitute or regenerate the reagents externally to restore the cell, as compared to driving current into the cell.

BACKGROUND OF THE INVENTION

Such energy storage and power generation systems have been known for many years. Major limitations of these systems have resulted from the practical application of what seems to be a simple direct chemical process. Hazardous materials, efficiencies, system size, plugging and clogging, gas formation, "plating out" or precipitation of the materials, membrane diffusion limitations, cost of materials and cost of operation highlight the practical problems. Another limitation of such systems is the loss of power output as the system discharges.

The fundamental chemical process in these systems is characterized by a chemical equation where the action proceeds in one direction in the charging of the system and in the opposite direction during the power generation by the system. An example of a redox system is given by the following chemical equation, the term "redox" defining reactions in which a reduction and a complementary oxidation occur together.

$$Cr^{2+}+Fe^{3+} \leftrightarrows Cr^{3+}+Fe^{2+} \qquad \text{Eq. 1}$$

In this system, limitations exist since the chromium is expensive and the chromium and iron, meant to be on either side of a membrane, cross over contaminating the other side. This necessitates frequent reprocessing of the electrolyte. Furthermore, noble metal catalysts are required to promote the reaction. Also, the system pH must be controlled to prevent gas formation.

U.S. Pat. No. 4,485,154 discloses an electrically chargeable anionically active reduction-oxidation system using a sulfide/polysulfide reaction in one half of the cell and an iodine/polyiodide, chlorine/chloride or bromine/bromide reaction in the other half of the cell.

The overall chemical reaction involved, for example for the bromine/sulfide system is

$$Br_2+S^{2-} \leftrightarrows 2Br^-+S \qquad \text{Eq. 2}$$

The electrochemical reaction takes place in separate but dependent bromine and sulfur reactions. The bromine reaction takes place on the $+^{ve}$ side of the membrane and the sulfur reaction on the $-^{ve}$ side of the membrane. When charging occurs the reaction goes from right to left and when discharging the reaction goes from left to right. During extended cycling of the cell ionic species diffuse through the membrane in an unwanted direction. Some sulfide diffuses into the $+^{ve}$ side of the cell and some of this sulfide is oxidised by the bromine in the $+^{ve}$ side to the sulfate $SO_4^{2-}$. Sulfates are not readily retrievable from the +ve electrolyte and thus represent a net loss of sulfur from the system.

U.S. patent application Ser. No. 128,117, now U.S. Pat. No. 5,496,659, discloses an electrochemical apparatus for energy storage and/or power delivery comprising multi-compartment cells with the $+^{ve}$ chamber and the $-^{ve}$ chamber of each cell being separated by at least one buffer chamber through which an idler electrolyte circulates. This apparatus is of particular use in carrying out the electrochemical reactions involved in the bromine/sulfide system discussed above. During extended cycling of the cell the $S^{2-}$ and/or $HS^-$ ions which otherwise would diffuse into the $+^{ve}$ chamber of the cell, migrate into the buffer chamber separating the $+^{ve}$ and $-^{ve}$ chambers of the cell. Some of the $S^{2-}$ and/or $HS^-$ ions which migrate into the buffer chamber from the $-^{ve}$ chamber of the cell are oxidised by bromine which migrates into the buffer chamber from the $+^{ve}$ chamber of the cell to form NaBr and sulfur as a precipitate. The free sulfur may be filtered from the idler electrolyte circulating through the buffer chamber and the filter periodically switched into the circulation of the electrolyte in the $-^{ve}$ chamber, the sulfur being restored by being resolubilized as polysulfide. However, the amount of $S^{2-}$ and/or $HS^-$ ions which migrate into the buffer chamber will generally be in excess of any bromine migrating into the buffer chamber. Thus over extended cycling there is a net loss of sulfur from the system.

We have now developed a process and apparatus which overcomes the above problem and prevents a net loss of sulfur from the $-^{ve}$ electrolyte of an energy storage and/or power delivery system in which the electrolyte circulating through the $-^{ve}$ chamber of the cell during power delivery contains sulfide.

SUMMARY OF THE INVENTION

Accordingly, the present invention provides an electrochemical apparatus for energy storage and/or power delivery comprising, in combination:

(a) means defining a single cell or an array of repeating cell structures, each cell with a chamber ($+^{ve}$ chamber) containing a $+^{ve}$ electrode and a chamber ($-^{ve}$ chamber) containing a $-^{ve}$ electrode, (b) means comprising a plurality of cation exchange membranes separating the $+^{ve}$ chamber and the $-^{ve}$ chamber of each cell by at least one buffer chamber, (c) means for circulating a $+^{ve}$ electrolyte through the $+^{ve}$ chamber (d) means for circulating a $-^{ve}$ electrolyte containing sulfide during power deliver through the $-^{ve}$ chamber, (e) means for circulating an idler electrolyte through the said buffer chamber;

(f) means for connecting said $+^{ve}$ electrodes to energy source (charging) means and to delivery (discharge) load means, (g) means for recharging the system by driving a DC current into the $+^{ve}$ electrode and out of the $-^{ve}$ electrode, and (h) means for restoring the electrolyte balance of the $-^{ve}$ electrolyte comprising means for the oxidation of $S^{2-}$ ions and/or HS⁻ ions contained in the idler electrolyte to form sulfur, means for the collection of precipitated sulfur and means for the reintroduction of the precipitated sulfur into the $-^{ve}$ electrolyte.

The apparatus of the present invention includes therein at least one buffer chamber separating the $+^{ve}$ chamber and the $-^{ve}$ chamber from one another by a plurality of cation exchange membranes. A plurality of buffer chambers may be used, if desired. During the operation of the cell, any ionic species which cross the cation exchange membranes, which in an ideal system would remain either in the $+^{ve}$ chamber or the $-^{ve}$ chamber of the cell, will collect in the buffer chamber or chambers.

The various compartments in the cell or cells are separated one from another by cation exchange membranes. Because of the incorporation of one or more buffer chambers into each cell, the constrictions on the choice of membrane are reduced because a single membrane does not have to try to satisfy both the requirements of the $+^{ve}$ electrolyte and the $-^{ve}$ electrolyte at the same time. Different membrane materials may be used to separate the $+^{ve}$ electrolyte from the buffer chamber and the $-^{ve}$ electrolyte from the buffer chamber.

The apparatus of the present invention may be used with the bromine/sulfide system described above and detailed in Eq. 2. The charge balance is provided by the transport of sodium, potassium, lithium or ammonium ions across the membranes in the cell. In carrying out this process, the idler electrolyte flowing through the buffer chamber will generally comprise a sulfide, for example, $Na_2S_x$, or a mixture of $Na_2S_x$ and NaBr. Other idler electrolytes may also be used, providing the electrolyte comprises a high conductivity salt of the ion which provides the charge balance in the cell. Thus, hydroxides, sulfates, chlorides or nitrates could also be used.

During charging the charge balancing ions, for example Na⁺ are transported across the membranes separating the $+^{ve}$ chamber from the $-^{ve}$ chamber to balance the charge and transform $Na_2S_x$ to $Na_2S$. The sulfur, which is present as a double charged polysulfide ion ($S^{2-}.S_y$, where $_y$ may be as high as 4), is reduced initially to $S^{2-}.S_{y-1}$ and eventually to $S^{2-}$. Some of the sulfide, $S^{2-}$, ions migrate into the buffer chamber across the membrane separating the $-^{ve}$ chamber from the buffer chamber. HS⁻ ions may also migrate into the buffer chamber. Br– is oxidised to $Br_2$ which goes into solution as tribromide ions, $Br_3^-$. Some $Br_2$ may migrate into the buffer chamber across the membrane separating the $+^{ve}$ chamber from the buffer chamber. Any bromine present in the buffer chamber will oxidise $S^{2-}$ ions and/or HS⁻ ions present to form NaBr and sulfur as a precipitate.

The idler electrolyte generally contains $S^{2-}$ and/or HS⁻ ions in excess and these ions are oxidized in accordance with the invention to precipitate sulfur which is collected, for example by filtration during the recirculation of the idler electrolyte. The filter may then be periodically switched into the circulation of the electrolyte in the $-^{ve}$ chamber. The sulfur is restored by being resolubilized as polysulfide and fed into the electrolyte for reuse. Any sulfur precipitated by oxidation of $S^{2-}$ and/or HS⁻ ions by bromine will also be reclaimed.

Suitable filters for use in the present invention include a compressed cylinder of microporous polypropylene in which electrolyte is fed from the outside of the hollow cylinder through its porous walls, or unwoven polypropylene fibre masses.

The means for the oxidation of $S^{2-}$ and/or HS⁻ ions preferably comprises an electrochemical cell through which the idler electrolyte is passed. In this cell $S^{2-}$ ions and HS⁻ ions are oxidized to sulfur by the passage of DC through the cell, the sulfur precipitating according to the following equations:

$$S^{2-} \rightarrow S\downarrow + 2e^- \qquad \text{Eq. 3A}$$

$$2HS^- \rightarrow 2S\downarrow + H_2 + 2e^- \qquad \text{Eq. 3B}$$

The electrochemical cell will preferably have smooth electrodes to prevent the precipitated sulfur from sticking to the surfaces thereof.

The electrochemical cell may be run periodically or continuously, but it will generally be more efficient to run the cell periodically when there is a sufficient build up of $S^{2-}$ and/or HS⁻ ions in the idler electrolyte. For example, it is possible to sense the concentration of these ions in solution using an electrochemical sensor, which provides an automatic reading of the concentration of these ions, or to sense the reference potential of a reference electrode and from this value, as compared to the potential of the electrode at a known concentration of the ions, to calculate the concentration of the ions in solution. Either the $S^{2-}$ and/or HS⁻ ion concentration of the idler electrolyte may be measured, or the $S^{2-}$ ion concentration of the $-^{ve}$ electrolyte may be measured in order to ascertain the loss of this species from the $-^{ve}$ electrolyte. As $S^{2-}$ ions are lost from the $-^{ve}$ chamber of the cell the overpotential on the $-^{ve}$ side of the cell will rise.

An alternative type of electrochemical cell may incorporate a carbon plug between the two electrodes in which the sulfur formed on oxidation of $S^{2-}$ and/or HS⁻ is trapped in situ. The cell may then be switched into the flow of $-^{ve}$ electrolyte and the operation of the cell reversed by reversing the polarity of the electrodes so that the precipitated sulfur is reduced electrochemically to $S^{2-}$ ions, according to the equation:

$$S\downarrow + 2e^- \rightarrow S^{2-} \qquad \text{Eq. 3C}$$

When the idler electrolyte comprises a mixture of $Na_2S_x$ and NaBr, some Br⁻ ions will diffuse back into the $+^{ve}$ chamber of the cell and so balance any bromine transported across the membrane by migration from the $-^{ve}$ side of the cell.

In order to enhance the reaction kinetics in the bromine/sulfide system, the $+^{ve}$ electrode may have a coating of non-conductive porous particles selected to increase the available surface area, to increase the surface wettability and to decrease the hydrolysis of bromine. A suitable coating comprises a mixture of silicon dioxide, a zeolite or like silicate in admixture with activated carbon.

Flow of the electrolytes on both sides of the two or more membranes is provided, preferably a recirculation rather than a once through flow in the majority of end uses. These recirculating electrolytes are stored in independent containers where the quantity may be large enough for the specific requirements of a preferred embodiment. The circulation also allows the electrolytes to be filtered, or otherwise reconstituted on a routine basis without taking the system off-line.

The $-^{ve}$ side preferably has an electrode which absorbs the $S^{2-}$ solution for subsequent discharge and enhances performance similar to that described at the $+^{ve}$ electrode.

Mid electrodes (also defined as intermediate or bipolar electrodes) combine the above such that a $+^{ve}$ electrode is provided on one surface, and a $+^{ve}$ electrode on another surface formed on the same substrate.

Although the present invention has been described above with specific reference to the bromine/sulfide system, it will be understood by those skilled in the art that the apparatus and process of the invention are applicable to any system in which sulfide ions will migrate across the cation exchange membrane into a buffer chamber provided between the $+^{ve}$ and $-^{ve}$ compartments of an electrochemical cell.

The present invention also includes within its scope an electrochemical process for energy storage and/or power delivery comprising the steps of:

a) maintaining circulating electrolyte flows in a single cell or in an array of repeating cell structures, each cell having a chamber ($+^{ve}$ chamber) containing a $+^{ve}$ electrode and a chamber ($-^{ve}$ chamber) containing a $-^{ve}$ electrode, the chambers being separated one from another by a plurality of cation exchange membranes which form one or more buffer chambers therebetween, wherein the electrolyte circulating via the $-^{ve}$ chamber during power delivery contains a sulfide and the electrolyte circulating in the buffer chamber or chambers comprises an idler electrolyte;

b) subjecting the idler electrolyte to oxidation to convert any $S^{2-}$ ions and/or $HS^-$ ions contained therein to sulfur;

c) collecting the precipitated sulfur; and d) reintroducing the precipitated sulfur into the $-^{ve}$ electrolyte.

Other objects, features and advantages will be apparent from the following detailed description of preferred embodiments thereof taken in conjunction with the accompanying drawings in which:

BRIEF DESCRIPTION OF THE DRAWINGS

FIG. 1A is a schematic view of a cell for use in the bromine/sulfide system containing a single buffer chamber;

FIG. 1B is a schematic view of a cell for use in the bromine/sulfide system containing two buffer chambers;

FIG. 1C is a diagram of a cell array using the FIG. 1A type cells; and

FIG. 2 is a schematic view of a sulfur reclamation cell for use with the cells as shown in FIG. 1A, FIG. 1B or FIG. 1C.

DETAILED DESCRIPTION OF THE DRAWINGS

FIGS. 1A and 1B illustrate the specific system using sodium bromide and sodium sulfide. It will be understood, however, that other salts may be substituted for these salts, as appropriate.

Referring to the drawings, FIG. 1A illustrates a single cell 1 with a $+^{ve}$ electrode 2 and a $-^{ve}$ electrode 4. Cation exchange membranes 6A and 6B separate the $+^{ve}$ chamber 8 of the cell 8 from the $-^{ve}$ chamber 10 of the cell and from the buffer chamber 12. The electrolyte circulating via the chamber 8 is NaBr fed along line 9, whilst the electrolyte circulating via the chamber 10 is $Na_2S_x$ fed along line 11.

Membranes 6A and 6B may be the same or different cation exchange membranes. Membrane 6A is in contact with bromine/bromide and must be resistant to attack by bromine at acid pH's. A preferred membrane for use on this side of the cell is a fluorocarbon polymer structure (having high chemical resistance to bromine) grafted with styrene via gamma irradiation and functionalized with sulfonic acid or carboxylic acid groups to provide charge carriers.

Membrane 6B may be the same as membrane 6A, but since it does not contact the bromine side of the cell a membrane that is not resistant to attack by bromine may be used. Examples of alternative membranes for use are NAFION (DuPont) or IONAC MC3470 (Sybron Chemical Co.).

The center buffer chamber 12 of the cell has an $Na_2S_x$ idler electrolyte circulating through it. When charging, $Na^+$ ions are transported from the $+^{ve}$ side 8, through the buffer chamber 12 (both membranes) to the $-^{ve}$ side 10 of the cell. On discharge, the opposite occurs with the $Na^+$ ions being transported from $-^{ve}$ side 10 to the $+^{ve}$ side 8 of the cell. Any bromine which migrates through membrane 6A will be retained in the idler electrolyte where it will oxidise any $S^{2-}$ and/or $HS^-$ ions which migrate through the membrane 6B to form NaBr and sulfur as a precipitate. The free sulfur precipitated in the idler electrolyte 13 may be removed by filtration through filter 14 as the electrolyte is recirculated to the buffer chamber 12. The rate of flow of the idler electrolyte through the buffer chamber 12 may be slower than the rate of flow of the electrolytes through the $-^{ve}$ chamber 10 and the $+^{ve}$ chamber 8, providing that it is sufficiently fast to prevent any precipitated sulfur from clogging the pores of the membranes 6A and 6B.

It will be appreciated that the amount of bromine and the amount of $S^{2-}$ and/or $HS^-$ ions which migrate across membranes 6A and 6B, respectively, will not generally be equivalent and one of these species will therefore generally be in excess in the idler electrolyte. Because $S^{2-}$ and/or $HS^-$ ions tend to migrate more readily across cation exchange membranes than bromine, $S^{2-}$ ions are most likely to be in excess in the idler electrolyte. The excess $S^{2-}$ ions can be oxidized to sulfur and precipitated and then filtered out of the idler electrolyte stream 13 by the filter 14.

Referring to FIG. 1B, a single cell 20 is illustrated with a $+^{ve}$ electrode 22 and a $-^{ve}$ electrode 24. Cation exchange membranes 26A, 26B and 26C separate the $+^{ve}$ chamber 28 of the cell from the $-^{ve}$ chamber 30 of the cell and thereby form a first buffer chamber 32 between membranes 26A and 26B and a second buffer chamber 34 between membranes 26B and 26C. The electrolyte circulating via the chamber 28 is NaBr fed along line 29, whilst the electrolyte circulating via the chamber 30 is $Na_2S_x$ fed along line 31.

Membranes 26A, 26B and 26C may be the same or different cation exchange membranes as described with reference to FIG. 1A.

The first buffer chamber 32 has an idler electrolyte 36 circulating through it which preferably is NaBr, whilst the second buffer chamber 34 has an idler electrolyte 38 circulating through it which is preferably $Na_2S_x$. When charging $Na^+$ ions are transported from the $+^{ve}$ side 28, through the buffer chambers 32 and 34 (all three membranes) to the $-^{ve}$ side 30 of the cell. Any bromine migrating through membrane 26A will mainly be retained in the idler electrolyte 36, although some bromine may migrate across membrane 26B into buffer compartment 34. Any $S^{2-}$ and/or $HS^-$ ions migrating across membrane 26C will be retained in the idler electrolyte 38, although some $S^{2-}$ or $HS^-$ ions may migrate across membrane 26B into buffer compartment 32. Where bromine encounters $S^{2-}$ or $HS^-$ ions it will oxidize these ions to form NaBr and sulfur which is precipitated. Any free sulfur which is precipitated in the electrolyte stream 36 may be removed by filtration of the idler electrolyte(s) through a filter (not shown). The rate of flow of the idler electrolytes through the buffer chambers 32 and 34 may be slower than the rate of flow of the electrolytes through the $+^{ve}$ chamber 28 and the $-^{ve}$ chamber 30, providing that the rates of flow are sufficiently fast to prevent any precipitated sulfur from clogging the pores of the membranes 26A, 26B and 26C.

FIG. 1C shows a cell array 40 of multiple cells connected in electrical series and fluid parallel. End electrodes 42E ($+^{ve}$) and 44E ($-^{ve}$) and multiple mid-electrodes 43 (each one having a $+^{ve}$ electrode portion 42A and $-^{ve}$ electrode portion 44A) are spaced out from each other by membranes 46 to form end cells $C_{E1}$ and $C_{E2}$ and an array of n# of mid cells $C_M$ (typically 10–20; but note much smaller and much higher numbers of cells can be accommodated). The end electrodes 42E ($+^{ve}$) and 44E ($-^{ve}$) have internal conductors 42F and 44F (typically copper screens) encapsulated therein and leading to external terminals 42G, 44G which are connected to external loads (e.g. to a motor M via a control circuit CONT, the motor driving a vehicle) or to power sources (e.g. a utility power grid when used as a load levelling device).

Each cell of the cell array is divided into a plurality of chambers by the membranes 46A and 46B, namely a $+^{ve}$ chamber 42C, a buffer chamber 43C and a $-^{ve}$ chamber 44C. Sodium bromide, NaBr, circulates as stream 48 as the electrolyte through the $+^{ve}$ chambers 42C, $Na_2S_x$ circulates as stream 50 as the idler electrolyte through chambers 43C and $Na_2S_x$ circulates as stream 52 as the idler electrolyte through chambers 43C.

A sulfur reclamation cell 54 through which the circulating idler electrolyte streams 13 (FIG. 1A), 38 (FIG. 1B) and 50 (FIG. 1C) are passed is shown in FIG. 2. The cell 54 comprises a $+^{ve}$ electrode 55 connected to terminal 55A and a $-^{ve}$ electrode 56 connected to a $-^{ve}$ terminal 56A. The idler electrolyte stream 13, 38 or 50 is passed to the central compartment of the cell 57 and a DC current is passed into the cell through $+^{ve}$ terminal 55A. In the central compartment 57 of the cell any $S^{2-}$ or $HS^-$ ions are oxidized according to Eq.3A and sulfur is precipitated. The electrolyte stream 13, 38 or 50 containing the precipitated sulfur is then passed through filter 58 where it is collected. The flow of the idler electrolyte into the filter is controlled by means of valve 59. The filter 58 is also connected into the streams of circulating $-^{ve}$ electrolytes 10, 31 and 52 via line 60. A valve 61 controls the flow of electrolyte 10, 31 or 52 into the filter whereupon the precipitated sulfur is resolubilized by the electrolyte 10, 31 or 52 to form polysulfides. It will be understood that when valve 61 is open, valve 59 will be closed and vice-versa. The idler electrolyte exits from the filter 58 via line 62 for return to the appropriate cell, whilst the reconstituted $-^{ve}$ electrolyte stream exits from the filter along line 63 for circulation via the $-^{ve}$ chamber of the appropriate cell.

A cell array, such as that shown in FIG. 1C may be encapsulated in the following manner. The cell array 40 is held between clamping blocks and dipped at one edge into a shallow container having a bath of liquid epoxy resin therein. The epoxy resin hardens to form a wall of the battery. Flow conduits such as manifolds with feed tubes for the electrolyte solutions are provided. These flow conduits are simultaneously encapsulated with the electrode and membrane edges.

The battery is rotated 90 degrees and the process repeated three times to form four long walls. Manifolds and tubes for electrolyte withdrawal are provided at the top face. Additional encapsulation can be provided at the backs of the end electrodes.

An alternative approach to encapsulation is to use a dissolvable or low melting point solid to fill the cell chambers and the manifolds and tubes of essentially all cells of battery 40. The battery is then dipped in its entirety into a deep epoxy resin bath. After the epoxy resin hardens, the battery is subjected to water or other solvent fed through its circulatory path to dissolve the solid, or is heated to melt the solid.

Another effective encapsulation approach is a plate and frame structure which has enough short-term sealing integrity to permit a single pouring of encasing polymer (epoxy). The polymer provides the long-term sealing along all edges of the electrodes and membranes.

In either embodiment of encapsulation the goal is to safeguard against: (a) cell to cell leakage; (b) leakage between tubes and between manifolds; (c) leakage to the environment; and (d) to provide short lengths of narrow cross section tubes.

Fabrication of Electrodes

End electrodes differ from the mid electrodes because they must have a metallic conductor embedded within the structure running across the electrode area. This is required because the resistivity of the substrate material from which they are formed is too high to allow adequate electrical conduction to an external electrical connector. For example a 10 inch by 10 inch square of substrate material of 0.10 inch thickness will have a resistance of about 10 ohms where a corresponding cell has an internal resistance of about 0.01 ohms. A sheet of copper of 0.01 inch thickness with approximately the same area embedded into the electrode will reduce the effective electrode resistance to about 100 micro ohms. The end electrodes are unipolar, whereas the mid-electrodes are bipolar. The conductor sheet is a thin screen structure embedded along the length of the end electrodes which make mechanically good contact along the current path.

The process of making the bipolar mid-electrodes is as follows. Substrates are formed of graphite flakes mixed with a plastic binder or other suitable binder, generally in a 1:1 weight ratio of such components. The mixture is freed from moisture by heating and/or desiccation methods, formed as sheets and hot pressed at temperatures and pressures appropriate to the materials used.

Then the substrates are coated on both the—and $+^{ve}$ surfaces with activated carbon particles by placing a sprinkling of such particles on mold plate surfaces and hot pressing the substrate to complete sealing of all voids in the substrate and to embed the particles in its surfaces.

After each pressing step, the press mold and its contents are cooled under pressure by using a water cooled heat exchanger to safeguard against bowing or warping and also to ensure a compact, non-porous structure.

End electrodes are prepared by making substrate by mixing graphite flakes and a plastic binder together, in the same general manner as described for the process of making bipolar mid-electrodes.

These substrates are then formed into a sandwich with a conductive screen, e.g. a copper screen, placed therebetween. This assembly is hot pressed to form the end electrode substrate and cooled under pressure to minimize warping.

One surface of this substrate is then surfaced with activated carbon or silicon dioxide particles, or a mixture of silicon dioxide/activated carbon particles, depending on whether a $-^{ve}$ electrode or a $+^{ve}$ electrode is being formed. This is effected by placing a sprinkling of the required particles (activated carbon or silicon dioxide) on the electrode surface and hot pressing to embed the particles in the surface thereof. After each pressing step the press mold and its contents are cooled, for example using a water-cooled heat exchanger to safeguard against bowing or warping.

Membranes

The preferred membrane for use in the bromine/sulfide system of the present invention, particularly for the membrane which contacts the bromine side of the cell is a cation exchange membrane formed from a fluorocarbon polymer grafted with styrene via gamma irradiation and subsequently sulfonated to give sulfonic acid pendant chains or grafted via gamma irradiation with an unsaturated carboxylic acid, such as acrylic or methacrylic acid, to give carboxylic acid pendant chains. The fluorocarbon is preferably a fluorinated ethylene-propylene copolymer. The membrane is prepared by grafting the styrene onto the fluorocarbon polymer using gamma irradiation and then sulfonating the grafted polymer, for example by using chlorosulfonic acid or grafting an unsaturated carboyxlic acid onto the fluorocarbon polymer usng gamma irradiation.

This membrane is preferably from 0.002 to 0.007 inches thick, more preferably about 0.005 inches thick. The membranes are made from an ethylene-propylene copolymer base film of the desired thickness which is grafted with styrene via gamma irradiation, for example from a cobalt-60 source. The radiation grafting of vinyl-substituted monomers to polyolefin films is known in the art and reference is made to U.S. Pat. Nos. 4,230,549 and 4,339,473.

The gamma irradiation of the fluorocarbon polymer forms free radical sites which are then available for reaction with the styrene monomer. The electrical resistance of the ion exchange membrane is directly related to the percentage of styrene grafted thereon when subsequently sulfonated, the electrical resistance decreasing as the percent graft increases. In general the useful range of the percent graft is from 10% to 35%, more preferably 10% to 20%. Percent graft is defined as the weight increase due to grafting divided by the initial weight of the polymer film multiplied by 100. The electrical resistance of the membrane is also related to the percentage of sulfonation which will generally be in the range of from 5% to 30%, more preferably 12% to 20%, the electrical resistance decreasing as the percentage of sulfonation increases.

The cation exchange membrane or membranes which do not contact the bromine side of the cell may be, for example, a heterogeneous structure made by Sybron Chemical Co. called IONAC MC3470. This is a cation exchange membrane containing sulfonated resins as the functional materials bonded together with Kynar. The material is bonded to a fibrous support sheet of glass cloth or polymer fiber. The specifications for this membrane are: 0.016 inches thick, 96% permselectivity and 5 ohms/square cm in 1N NaCl.

Other membranes which may be used are those sold under the trade name of Nafion (DuPont), for example Nafion 115 or 117.

Compensation for Migration

Because water is transferred across the membrane by osmosis or electro-osmosis, it becomes necessary to correct for this happening. This is accomplished by reverse osmosis, by evaporation of water from the appropriate electrolyte or by electrodialysis.

Specific Embodiments

The present invention will be further described with reference to the following non-limiting Examples.

EXAMPLE 1

A three compartment cell was constructed with two uu carbon surfaced electrodes separated by two Nafion 117 membranes. The cell component spacings were 0.25 cm from $-^{ve}$ electrode to membrane, 0.62 cm between membranes and 0.25 cm from $+^{ve}$ electrode to membrane. The active area of the cell was 155 cm$^2$.

The electrolytes were:

| | |
|---|---|
| Positive side | 300 cc of 6 molar NaBr |
| Negative side | 300 cc of 0.75 molar Na$_2$S$_5$ |
| Buffer Chamber | 300 cc of 3 molar NaBr |

During operation of the cell bromine diffuses through the membrane from the (+) side into the middle chamber at a lower rate than sulfide. The sulfide is precipitated as sulfur via the reclamation cell as illustrated in FIG. 2 of the accompanying drawings.

The three compartment cell was cycled at 4 amps for over 100 cycles. The sulfide concentration in the middle cell was measured by wet chemical analysis method and some concentrations are given in Table 1 below. The reclamation cell was operated intermittently at 0.5 amps.

TABLE 1

| Cycle No. | S$^{2-}$ Concentration Millimoles/Liters | Reclamation Cell Mode |
|---|---|---|
| 0 | 0.4 | Off |
| 5 | 2.1 | " |
| 12 | 5.9 | " |
| 20 | 11.7 | " |
| 26 | 15.2 | " |
| 31 | 21 | " |
| 35 | 24.5 | " |
| 36 | 25.2 | ON |
| 40 | 19 | " |
| 51 | 17 | " |
| 58 | 14.4 | " |
| 71 | 12 | " |
| 75 | 11.3 | " |
| 84 | 11.7 | " |

As the cell was cycled the sulfide concentration increased as expected, but when the reclamation cell was switched on the concentration diminished to lower steady state values.

What is claimed is:

1. An electrochemical process for energy storage and/or power delivery comprising the steps of:

a) maintaining circulating electrolyte flows in a single cell or in an array of repeating cell structures, each cell having a chamber +$^{ve}$ chamber) containing a +$^{ve}$ electrode and a chamber (−$^{ve}$ chamber) containing a −$^{ve}$ electrode, the chambers being separated one from another by a plurality of cation exchange membranes which form one or more buffer chambers therebetween, wherein the electrolyte circulating via the −$^{ve}$ chamber during power delivery contains a sulfide and the electrolyte circulating in the buffer chamber or chambers comprises an idler electrolyte;

b) oxidizing any S$^{2-}$ ions and/or HS$^-$ ions contained in the idler electrolyte to sulfur as precipitated sulfur;

c) collecting the precipitated sulfur; and d) reintroducing the precipitated sulfur into the −$^{ve}$ electrolyte.

2. A process as claimed in claim 1, wherein the step of oxidizing the S$^{2-}$ and/or HS$^-$ ions to sulfur comprises electrochemically oxidizing the S$^{2-}$ and/or HS$^-$ ions.

3. A process as claimed in claim 1 wherein the precipitated sulfur is collected in a filter.

4. A process as claimed in claim 2 wherein the precipitated sulfur is collected in a carbon plug incorporated into an electrochemical cell in which the step of oxidizing the $S^{2-}$ and/or $HS^-$ ions is conducted.

5. A process as claimed in claim 3 wherein the precipitated sulfur is reintroduced into the $-^{ve}$ electrolyte by placing the filter in the $-^{ve}$ electrolyte stream whereby the precipitate sulfur is resolubilized as polysulfide.

6. A process as claimed in claim 4 wherein the electrochemical cell containing the carbon plug is switched into the circulating $-^{ve}$ electrolyte stream and the polarity of the electrodes reversed, whereby the precipitated sulfur collected within the carbon plug is electrochemically reduced to $S^{2-}$ ions.

7. A process as claimed in claim 1 wherein the cell structures are subjected to alternate charge/discharge cycles.

8. A process as claimed in claim 1 wherein step (c) is carried out continuously.

9. A process as claimed in claim 1 wherein step (d) is carried out continuously.

10. A process as claimed in claim 1 wherein step (c) is carried our periodically.

11. A process as claimed in claim 1 wherein step (d) is carried our periodically.

* * * * *